(12) United States Patent
Miyazaki et al.

(10) Patent No.: US 12,341,324 B2
(45) Date of Patent: Jun. 24, 2025

(54) METHOD FOR MANUFACTURING ELECTRIC JUNCTION BOX

(71) Applicant: YAZAKI CORPORATION, Tokyo (JP)

(72) Inventors: Yoshiya Miyazaki, Makinohara (JP); Hirotaka Kurita, Makinohara (JP); Nobutaka Kaneko, Makinohara (JP); Ginga Tanaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 217 days.

(21) Appl. No.: 18/451,771

(22) Filed: Aug. 17, 2023

(65) Prior Publication Data

US 2024/0097412 A1 Mar. 21, 2024

(30) Foreign Application Priority Data

Sep. 21, 2022 (JP) ................. 2022-150398

(51) Int. Cl.
*H02B 3/00* (2006.01)
*H02B 1/20* (2006.01)
*H02B 1/48* (2006.01)

(52) U.S. Cl.
CPC ............... *H02B 3/00* (2013.01); *H02B 1/20* (2013.01); *H02B 1/48* (2013.01)

(58) Field of Classification Search
CPC ........ B60R 16/0239; H02B 1/20; H02B 1/48; H02B 3/00
See application file for complete search history.

(56) References Cited

U.S. PATENT DOCUMENTS

| | | | | |
|---|---|---|---|---|
| 2012/0064741 | A1* | 3/2012 | Kawaguchi | H05K 5/0026 |
| | | | | 439/76.2 |
| 2012/0200988 | A1* | 8/2012 | Uchida | H05K 1/029 |
| | | | | 361/624 |
| 2016/0272132 | A1* | 9/2016 | Hachiya | H05K 3/4626 |
| 2018/0065576 | A1* | 3/2018 | Kawaguchi | H01R 9/226 |
| 2018/0326924 | A1* | 11/2018 | Haraguchi | H02G 3/16 |
| 2020/0118778 | A1* | 4/2020 | Oda | H01H 45/14 |
| 2023/0007958 | A1* | 1/2023 | Takamizawa | G01K 1/14 |

FOREIGN PATENT DOCUMENTS

| | | |
|---|---|---|
| JP | 2017-22808 A | 1/2017 |
| JP | 2020-188533 A | 11/2020 |

* cited by examiner

*Primary Examiner* — Timothy J Thompson
*Assistant Examiner* — Rhadames Alonzo Miller
(74) *Attorney, Agent, or Firm* — KENEALY VAIDYA LLP (57) ABSTRACT

There is provided a method for manufacturing an electric junction box that includes: a first bus bar and a second bus bar having one shape selected from a plurality of types of shapes; a housing that accommodates the first bus bar and the second bus bar; and a plurality of input and output portions to which a terminal connected to an external power supply is connectable. The manufacturing method includes: a first operation of providing the first bus bar and the second bus bar that have one of predetermined shapes selected based on a specification of the electric junction box; and a second operation of accommodating the first bus bar and the second bus bar provided by the first operation in the housing.

3 Claims, 5 Drawing Sheets

METHOD FOR MANUFACTURING ELECTRIC JUNCTION BOX

CROSS-REFERENCE TO RELATED APPLICATIONS

This application is based on and claims priority under 35 USC 119 from Japanese Patent Application No. 2022-150398 filed on Sep. 21, 2022, the contents of which are incorporated herein by reference.

TECHNICAL FIELD

The present disclosure relates to a method for manufacturing an electric junction box.

BACKGROUND ART

In the related art, there has been known an electric junction box configured by accommodating a plurality of bus bars in a housing, such as an electric junction box (for example, a relay box) mounted on a vehicle (for example, see JP2020-188533A and JP2017-022808A).

When the electric junction box as described above is manufactured, depending on the specifications of the vehicle, the presence or absence of optional equipment, or the like, arrangement of an input and output portion (for example, a portion where the terminal is fastened to a bus bar by a bolt and a nut) to which a terminal connected to an external power supply is connected, the type of an electronic component (for example, a fuse, a relay, or the like) stored in the electric junction box, and arrangement of the electronic component in the electric junction box may be different.

In order to cope with such a difference, it is conceivable to prepare a plurality of types (product numbers) having different shapes, structures, and the like based on specifications and the like of the vehicle even for the bus bar and the housing. However, from a viewpoint of the manufacturing cost of the electric junction box and complexity of manufacturing management, it is not desirable to excessively increase the types (product numbers) of the bus bars and the housings to be prepared.

SUMMARY OF INVENTION

The present disclosure provides a method for manufacturing an electric junction box capable of reducing the types of bus bars and housings to be prepared while implementing the electric junction box so as to meet a plurality of required specifications.

According to an illustrative aspect of the present disclosure, a method for manufacturing an electric junction box, the electric junction box includes: a first bus bar having one shape selected from a plurality of types of shapes; a second bus bar having one shape selected from a plurality of types of shapes; a housing that accommodates the first bus bar and the second bus bar; and a plurality of input and output portions to which a terminal connected to an external power supply is connectable. The first bus bar and the second bus bar have a selectable shape that is one of a first shape and a second shape. The first shape is a shape where parts of the plurality of input and output portions are a member of the first bus bar and the other part of the plurality of input and output portions is a member of the second bus bar, and the second shape is a shape where a part of the plurality of input and output portions is a member of the first bus bar and the other parts of the plurality of input and output portions are a member of the second bus bar. The housing is configured to accommodate the first bus bar and the second bus bar that have the first shape and the first bus bar and the second bus bar that have the second shape.

The manufacturing method includes: a first operation of providing the first bus bar and the second bus bar that have one of the first shape and the second shape selected based on a specification of the electric junction box; and a second operation of accommodating the first bus bar and the second bus bar provided by the first operation in the housing.

The present disclosure has been briefly described above. Further, the details of the present disclosure are further clarified by reading modes for carrying out the disclosure described below with reference to the accompanying drawings.

DESCRIPTION OF EMBODIMENTS

First Embodiment

Hereinafter, a method for manufacturing an electric junction box 1 according to a first embodiment of the present disclosure will be described with reference to the drawings. The electric junction box 1 is typically a relay box that is mounted on a vehicle and accommodates electronic components such as a relay and a fuse.

Hereinafter, for convenience of description, as illustrated in FIGS. 1 to 5, "front", "rear", "left", "right", "upper", and "lower" are defined. A "front-rear direction", a "left-right direction", and an "upper-lower direction" are orthogonal to one another. When the electric junction box 1 is mounted on a vehicle, the "upper-lower direction" corresponds to the upper-lower direction of the vehicle.

Figure 1:
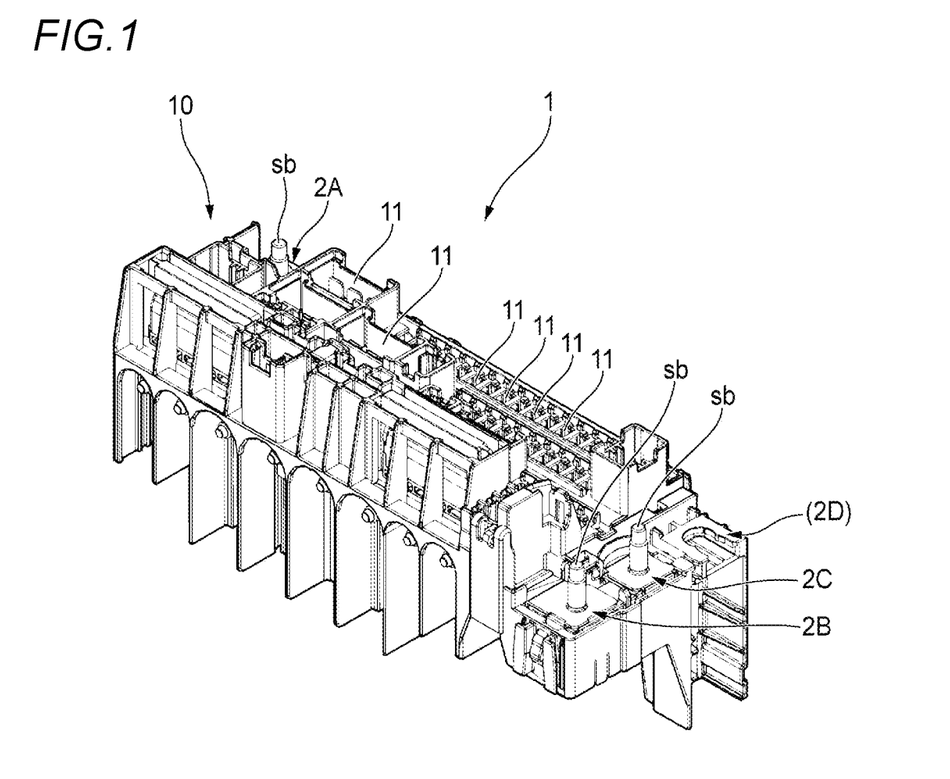
FIG. 1 is a perspective view of an electric junction box according to a first embodiment of the present disclosure.
Figure 2:
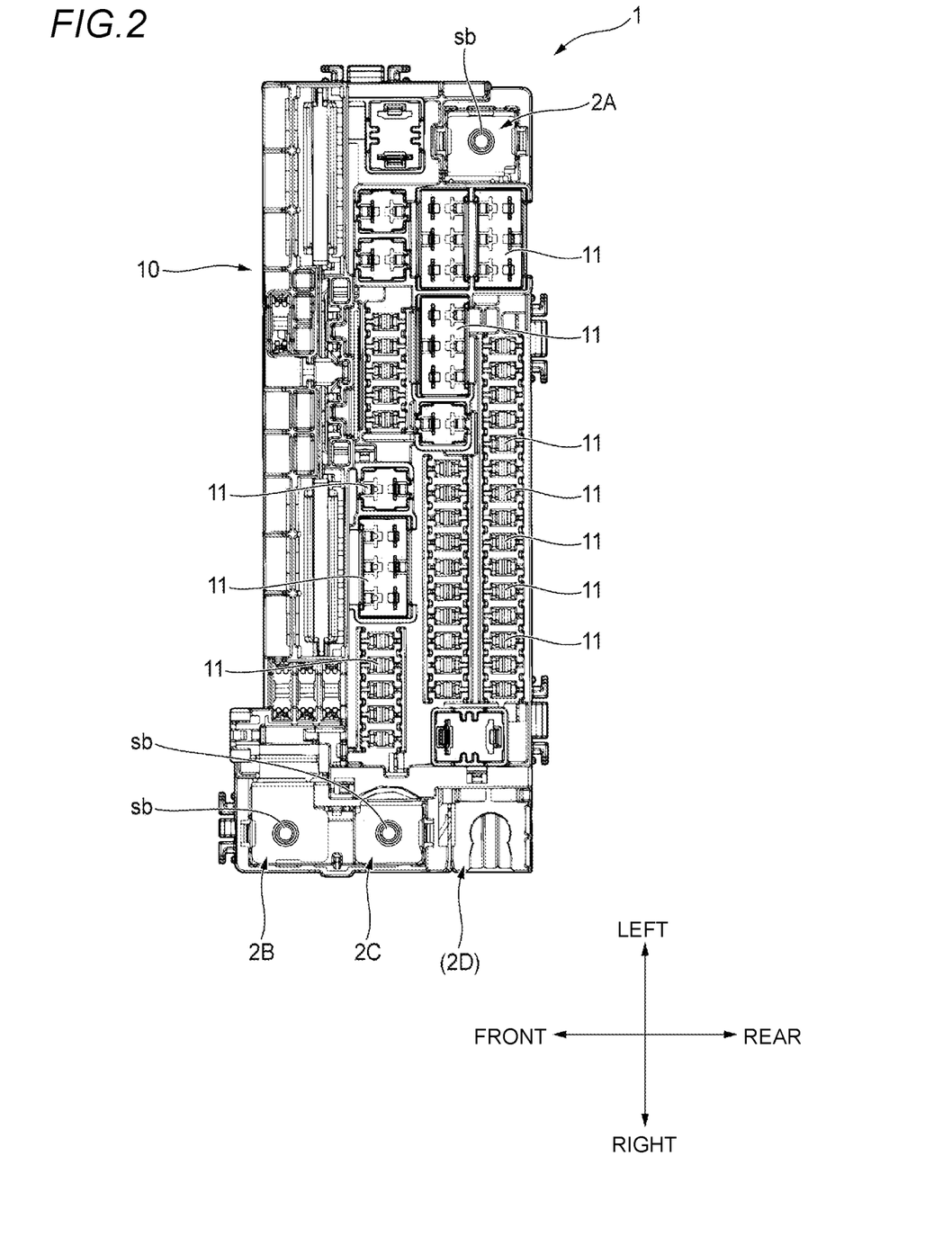
FIG. 2 is a top view of the electric junction box illustrated in FIG. 1.

As illustrated in FIGS. 1 and 2, the electric junction box 1 includes a housing 10. The housing 10 is also referred to as a relay box block. The housing 10 is a component that constitutes a part of a case body of the electric junction box 1. The entire case body of the electric junction box 1 includes, for example, the housing 10, a frame (not illustrated) to which the housing 10 is assembled, an upper cover (not illustrated) assembled to an upper portion of the frame, and a lower cover (not illustrated) assembled to a lower portion of the frame. All of the plurality of components constituting the case body of the electric junction box 1 are resin molded bodies.

As illustrated in FIGS. 1 and 2, the housing 10 has a shape extending in the left-right direction. A plurality of cavities 11 are formed on the upper surface of the housing 10 so as to be arranged in the front-rear direction and the left-right direction. Each cavity 11 is a recessed portion that opens upward and is recessed downward. Electronic components (not illustrated) such as relays and fuses are inserted from above and accommodated in the cavities 11. A plurality of input and output portions 2A to 2C to which terminals (not illustrated) connected to an external power supply are connected are provided at both end portions of the upper surface of the housing 10 in the left-right direction so as to be exposed to the outside.

In this example, the input and output portion 2A is disposed on a left end portion of the upper surface of the housing 10, and the input and output portions 2B and 2C are disposed on a right end portion of the upper surface of the housing 10 such that the input and output portion 2C is positioned behind the input and output portion 2B and the input and output portions 2B and 2C are arranged side by side in the front-rear direction. In each of the plurality of input and output portions 2A to 2C, a stud bolt sb made of metal extends upward from a flat plate made of metal extending in the front-rear direction and the left-right direction (disposed such that a plate thickness direction is oriented in the upper-lower direction). In each of the plurality of input and output portions 2A to 2C, the terminal connected to the external power supply is bolt-fastened using the stud bolt sb. Each of the plurality of input and output portions 2A to 2C corresponds to an "input and output portion" of the present disclosure.

Figure 3:
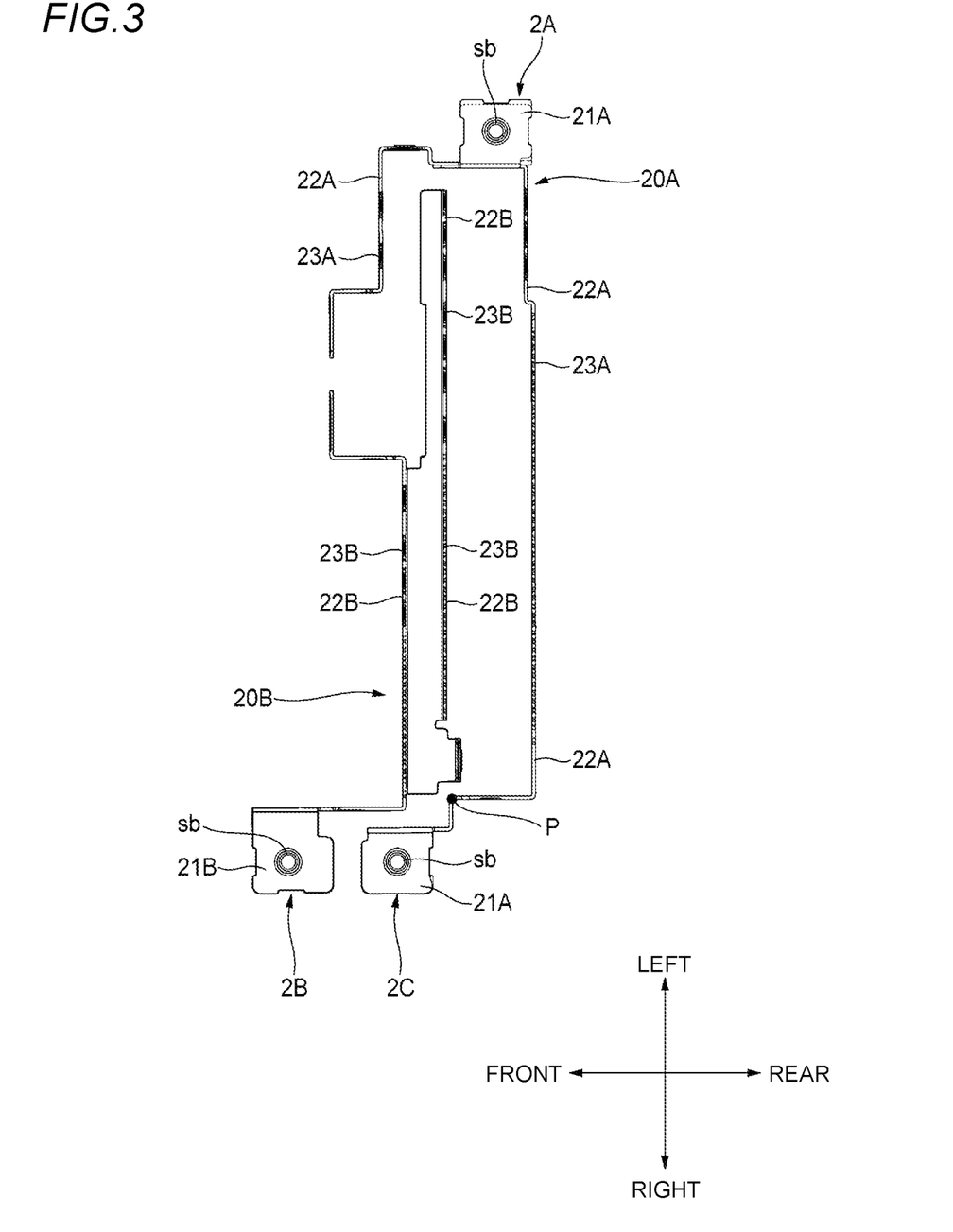
FIG. 3 is a top view illustrating only a first bus bar and a second bus bar having a first shape in a state in which the first bus bar and the second bus bar are assembled to the electric junction box illustrated in FIG. 1.
Figure 4:
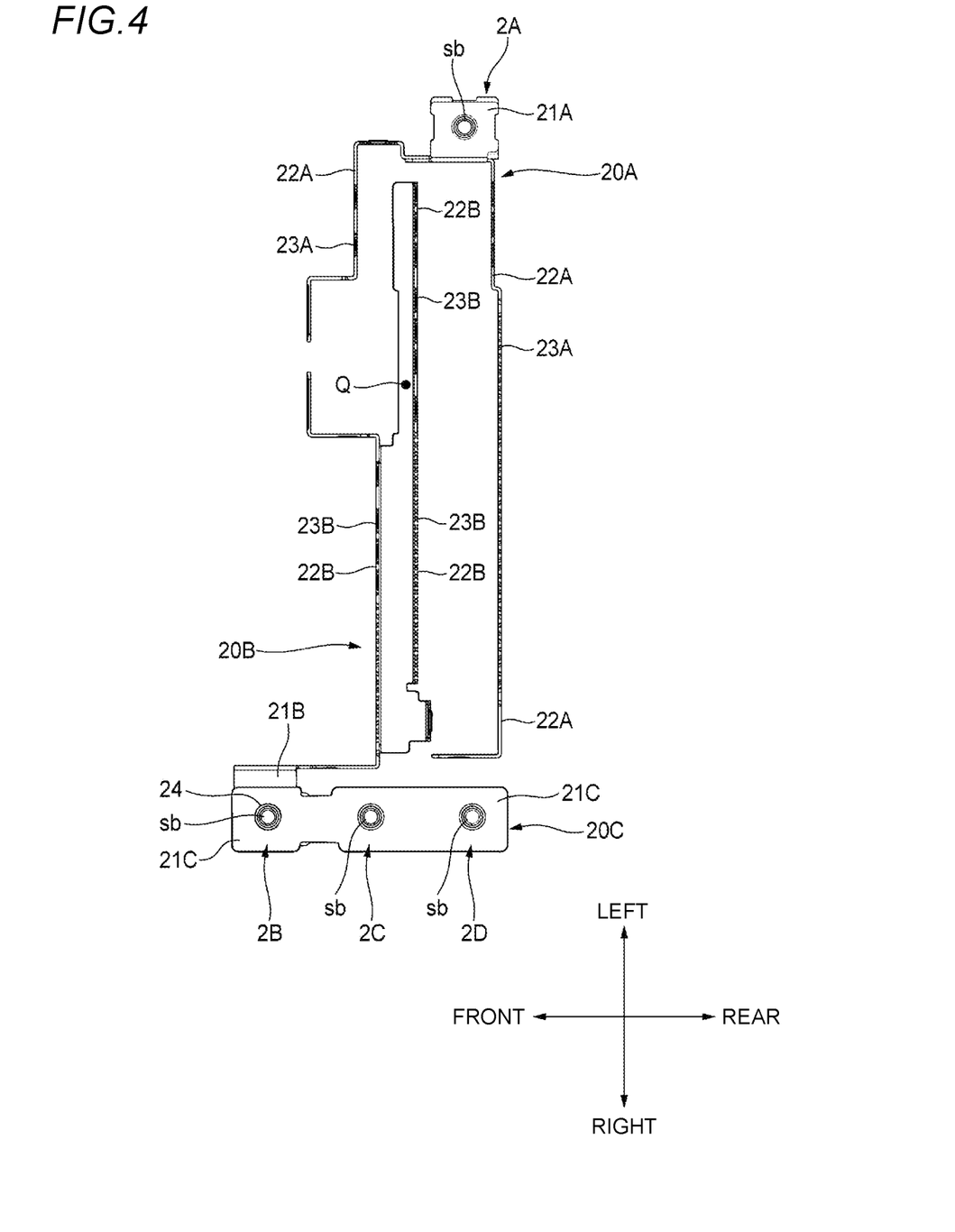
FIG. 4 is a top view illustrating only a first bus bar and a second bus bar having an example of a second shape in a state in which the first bus bar and the second bus bar are assembled to an electric junction box illustrated in FIG. 1 according to a second embodiment.

As illustrated in FIG. 3 or 4, a plate-shaped first bus bar 20A and a plate-shaped second bus bar 20B are accommodated in the housing 10 illustrated in FIGS. 1 and 2. The first bus bar 20A and the second bus bar 20B are assembled to the housing 10 from below. Each of the first bus bar 20A and the second bus bar 20B has a function of electrically connecting the terminal connected to the external electric supply and a part of the plurality of electronic components accommodated in the plurality of cavities 11. Each of the first bus bar 20A and the second bus bar 20B is formed by pressing (punching) and bending a metal plate.

The first bus bar 20A and the second bus bar 20B have a selectable shape that is one of a first shape illustrated in FIG. 3 as the first embodiment and a second shape illustrated in FIG. 4 as the second embodiment. Specifically, one of the first bus bar 20A and the second bus bar 20B having the first shape (the first embodiment) illustrated in FIG. 3 and the first bus bar 20A and the second bus bar 20B having the second shape (the second embodiment) illustrated in FIG. 4 is selected based on the specifications of the electric junction box 1, and the selected first bus bar 20A and second bus bar 20B are assembled to the housing 10. The housing 10 is configured to accommodate both the first bus bar 20A and the second bus bar 20B having the first shape and the first bus bar 20A and the second bus bar 20B having the second shape.

First, the first bus bar 20A and the second bus bar 20B having the first shape illustrated in FIG. 3 will be described as the first embodiment. Each of the first bus bar 20A and the second bus bar 20B having the first shape illustrated in FIG. 3 has a previously prepared basic shape extending substantially in the left-right direction.

The first bus bar 20A having the first shape includes two fastening portions 21A and an erected portion 22A. The two fastening portions 21A are positioned at both end portions in the left-right direction of the first bus bar 20A having the first shape. Each of the fastening portions 21A has a flat plate shape extending in the front-rear direction and the left-right direction (the plate thickness direction is oriented in the upper-lower direction). Each of the fastening portions 21A is provided with the stud bolt sb protruding upward. The erected portion 22A has a shape in which a width direction orthogonal to an extending direction is oriented in the upper-lower direction and extends in a band shape. A plurality of terminal portions 23A having a shape protruding upward are provided on an upper end surface (an upper side end surface) of the erected portion 22A so as to be aligned along the extending direction of the erected portion 22A. The terminal portion 23A corresponds to a "component attachment portion" of the present disclosure.

In a state in which the first bus bar 20A having the first shape is assembled to the housing 10, the left fastening portion 21A functions as the input and output portion 2A, and the right fastening portion 21A functions as the input and output portion 2C (see FIGS. 1 and 2). Each of the plurality of terminal portions 23A provided on the erected portion 22A is arranged so as to be exposed in the corresponding cavity 11 among the plurality of cavities 11 and is electrically connected to the corresponding electronic component among the plurality of electronic components.

The second bus bar 20B having the first shape includes one fastening portion 21B and an erected portion 22B. One fastening portion 21B is positioned at a right end portion of the second bus bar 20B having the first shape. The fastening portion 21B has a flat plate shape extending in the front-rear direction and the left-right direction (the plate thickness direction is oriented in the upper-lower direction). The fastening portion 21B is provided with the stud bolt sb protruding upward. The erected portion 22B has a shape in which a width direction orthogonal to an extending direction is oriented in the upper-lower direction and extends in a band shape. A plurality of terminal portions 23B having a shape protruding upward are provided on an upper end surface (an upper side end surface) of the erected portion 22B so as to be aligned along the extending direction of the erected portion 22B. The terminal portion 23B corresponds to the "component attachment portion" of the present disclosure.

In a state in which the second bus bar 20B having the first shape is assembled to the housing 10, the fastening portion 21B functions as the input and output portion 2B (see FIGS. 1 and 2). Each of the plurality of terminal portions 23B provided on the erected portion 22B is arranged so as to be exposed to the corresponding cavity 11 among the plurality of cavities 11 and is electrically connected to the corresponding electronic component among the plurality of electronic components.

Second Embodiment

Next, the first bus bar 20A and the second bus bar 20B having the second shape illustrated in FIG. 4 will be described as the second embodiment. The first bus bar 20A having the second shape illustrated in FIG. 4 is obtained by, for example, cutting and removing a portion (a portion including the right fastening portion 21A) on the right side from a cutting point P (see FIG. 3) with respect to the first bus bar 20A having the first shape (=the basic shape described above) illustrated in FIG. 3. The terminal portion 23A is not provided in the erected portion 22A included in the portion separated to the right side from the cutting point P (see FIG. 3) in the first bus bar 20A having the first shape.

The second bus bar 20B having the second shape illustrated in FIG. 4 is obtained by assembling an auxiliary bus bar 20C as a part of the second bus bar 20B to the fastening portion 21B with respect to the second bus bar 20B having the first shape (=the basic shape) illustrated in FIG. 3. The metal auxiliary bus bar 20C includes only a fastening portion 21C. The fastening portion 21C has a flat plate shape elongated in the front-rear direction and a band shape extending in the front-rear direction and the left-right direction (the plate thickness direction is oriented in the upper-lower direction). A through hole 24 is formed in a front end portion of the fastening portion 21C, and the stud bolts sb protruding upward are provided in a center portion and a rear end portion in the front-rear direction of the fastening portion 21C. The stud bolt sb provided in the fastening portion 21B of the second bus bar 20B is inserted into the through hole 24 of the fastening portion 21C, and the fastening portion 21B and the front end portion of the fastening portion 21C that are overlapped with each other are joined by welding or the like, whereby the second bus bar 20B having the second shape illustrated in FIG. 4 is obtained.

In a state in which the first bus bar 20A and the second bus bar 20B having the second shape are assembled to the housing 10, the fastening portion 21A of the first bus bar 20A functions as the input and output portion 2A, the front end portion of the fastening portion 21C of the second bus bar 20B (a portion including the stud bolt sb protruding from the fastening portion 21B) functions as the input and output portion 2B, and the center portion in the front-rear direction of the fastening portion 21C of the second bus bar 20B (a portion including the front stud bolt sb of the pair of front and rear stud bolts sb protruding from the fastening portion 21C) functions as the input and output portion 2C. That is, the auxiliary bus bar 20C is configured to compensate for a portion corresponding to a portion on the right side (in particular, the right fastening portion 21A) from the cutting point P separated from the first bus bar 20A having the first shape. Further, a rear end portion of the fastening portion 21C of the second bus bar 20B (a portion including the rear stud bolt sb of the pair of front and rear stud bolts sb protruding from the fastening portion 21C) functions as an input and output portion 2D (see FIGS. 1 and 2).

When the first shape illustrated in FIG. 3 is compared with the second shape illustrated in FIG. 4, regarding the plurality of "input and output portions" (the input and output portions 2A to 2C), in the first shape illustrated in FIG. 3, the input and output portions 2A and 2C belong to the first bus bar 20A and the input and output portion 2B belongs to the second bus bar 20B, whereas in the second shape illustrated in FIG. 4, unlike the first shape illustrated in FIG. 3, the input and output portion 2A belongs to the first bus bar 20A and the input and output portions 2B and 2C belong to the second bus bar 20B. With respect to the plurality of "component attachment portions" (the plurality of terminal portions 23A and 23B), the plurality of terminal portions 23A belong to the first bus bar 20A and the plurality of terminal portions 23B belong to the second bus bar 20B in either the first shape illustrated in FIG. 3 or the second shape illustrated in FIG. 4. In other words, in the first shape illustrated in FIG. 3 and the second shape illustrated in FIG. 4, the arrangement and the number of the "input and output portions" belonging to the first bus bar 20A (the second bus bar 20B) are different for the plurality of "input and output portions" (the input and output portions 2A to 2C), whereas the arrangement and the number of the "component attachment portions" belonging to the first bus bar 20A (the second bus bar 20B) are the same for the plurality of "component attachment portions" (the plurality of terminal portions 23A and 23B). The first bus bar 20A and the second bus bar 20B having the first shape illustrated in FIG. 3 and the first bus bar 20A and the second bus bar 20B having the second shape illustrated in FIG. 4 have been described above.

When manufacturing the electric junction box 1, first, one of the first bus bar 20A and the second bus bar 20B having the first shape illustrated in FIG. 3 and the first bus bar 20A and the second bus bar 20B having the second shape illustrated in FIG. 4 is selected, and the selected first bus bar 20A and second bus bar 20B are prepared (first step). Next, the prepared (selected) first bus bar 20A and second bus bar 20B are assembled to the housing 10 (second step). Thus, the electric junction box 1 illustrated in FIGS. 1 and 2 is obtained.

Third Embodiment

In the first and second embodiments, one of the first bus bar 20A and the second bus bar 20B having the first shape (the first embodiment) illustrated in FIG. 3 and the first bus bar 20A and the second bus bar 20B having the second shape (the second embodiment) illustrated in FIG. 4 is selected based on the specifications of the electric junction box 1, and the selected first bus bar 20A and second bus bar 20B are assembled to the housing 10. In contrast, instead of the first bus bar 20A and the second bus bar 20B having the second shape illustrated in FIG. 4, the first bus bar 20A and the second bus bar 20B having a shape illustrated in FIG. 5 may be used in a third embodiment. The shape illustrated in FIG. 5 is the same as the shape illustrated in FIG. 4 (the second embodiment) in that the first bus bar 20A and the second bus bar 20B have the shape different from the basic shape described above (the first embodiment, see FIG. 3), and thus is hereinafter referred to as the second shape as in the second embodiment.

Figure 5:
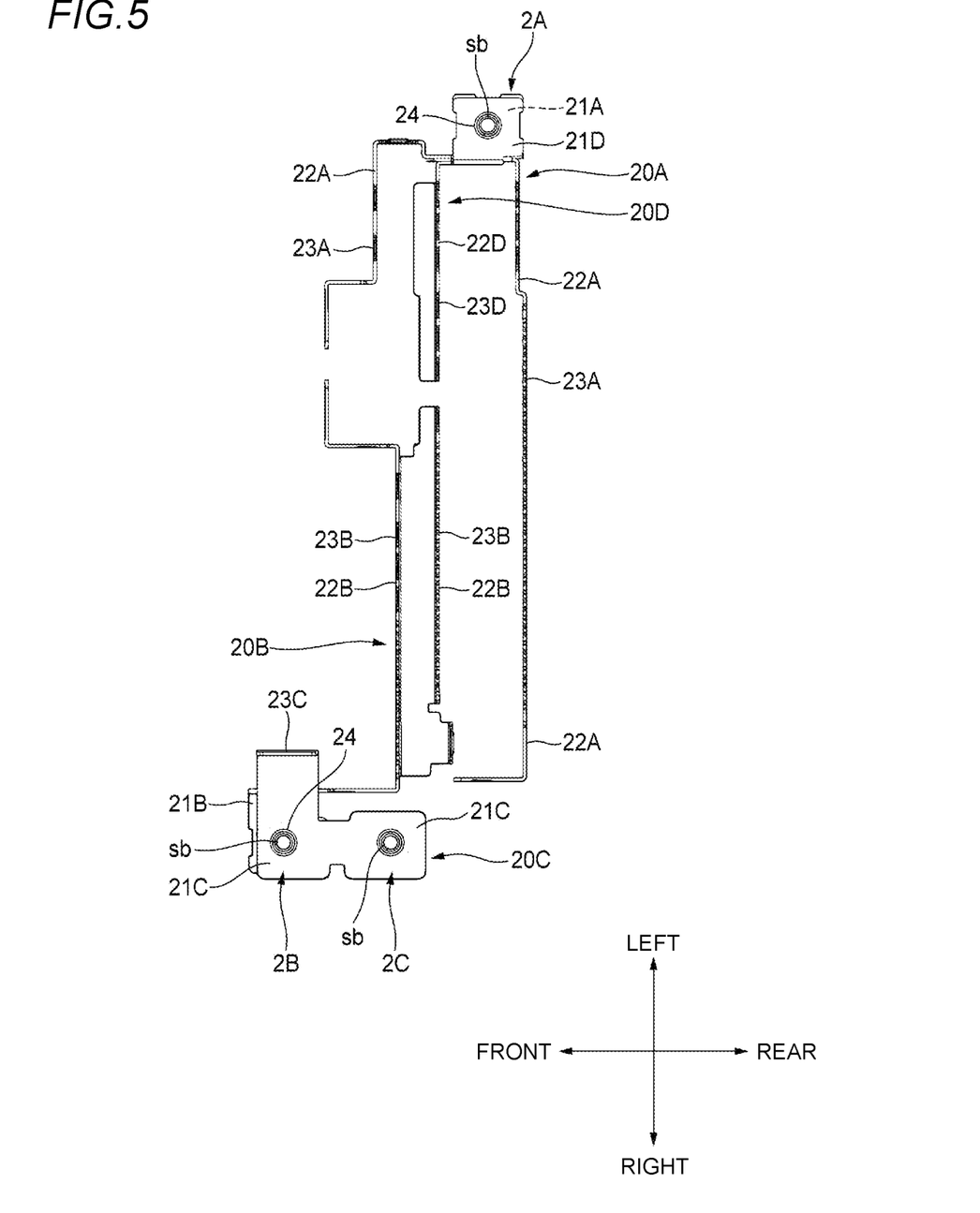
FIG. 5 is a view corresponding to FIG. 4 and illustrating a first bus bar and a second bus bar having another example of a second shape according to a third embodiment.

In other words, one of the first bus bar 20A and the second bus bar 20B having the first shape (first embodiment) illustrated in FIG. 3 and the first bus bar 20A and the second bus bar 20B having the second shape (the third embodiment) illustrated in FIG. 5 may be selected based on the specifications of the electric junction box 1, and the selected first bus bar 20A and second bus bar 20B may be assembled to the housing 10.

Hereinafter, the first bus bar 20A and the second bus bar 20B having the second shape illustrated in FIG. 5 will be described. The second bus bar 20B having the second shape illustrated in FIG. 5 is obtained by separating a portion on the left side of a cutting point Q (see FIG. 4) from the second bus bar 20B having the second shape illustrated in FIG. 4 by, for example, cutting and removing the portion, and assembling the auxiliary bus bar 20C illustrated in FIG. 5 having a shape different from that of the auxiliary bus bar 20C illustrated in FIG. 4 to the fastening portion 21B. The erected portion 22B included in a portion (hereinafter, referred to as a "separated portion") separated on the left side from the cutting point Q in the second bus bar 20B illustrated in FIG. 4 includes a part of the plurality of terminal portions 23B (see FIG. 4).

The auxiliary bus bar 20C illustrated in FIG. 5 is different from the auxiliary bus bar 20C illustrated in FIG. 4 in that a portion corresponding to the input and output portion 2D (a rear end portion of the auxiliary bus bar 20C illustrated in FIG. 4) is removed, and a portion corresponding to the input and output portion 2B (a front end portion of the auxiliary bus bar 20C illustrated in FIG. 4) is further extended leftward, and a terminal portion 23C having a shape protruding upward is provided at an extended end portion (a left end portion). The terminal portion 23C corresponds to the "component attachment portion" of the present disclosure.

The first bus bar 20A having the second shape illustrated in FIG. 5 is obtained by assembling an auxiliary bus bar 20D as a part of the first bus bar 20A to the fastening portion 21A with respect to the first bus bar 20A having the second shape illustrated in FIG. 4. The metal auxiliary bus bar 20D includes a fastening portion 21D and an erected portion 22D. The fastening portion 21D has a flat plate shape extending in the front-rear direction and the left-right direction (the plate thickness direction is oriented in the upper-lower direction). The through hole 24 is formed in the fastening portion 21D. The stud bolt sb provided in the fastening portion 21A of the first bus bar 20A is inserted into the through hole 24 of the fastening portion 21D, and the fastening portion 21A and the fastening portion 21D that are overlapped with each other are joined by welding or the like, whereby the first bus bar 20A having the second shape illustrated in FIG. 5 is obtained. The erected portion 22D of the auxiliary bus bar 20D has a shape in which a width direction orthogonal to an extending direction is oriented in the upper-lower direction and extends in a band shape, and is disposed at a position corresponding to a position where the separated portion is disposed so as to compensate for the separated portion. On an upper end surface (an upper side end surface) of the erected portion 22D, a plurality of terminal portions 23D having a shape protruding upward are provided so as to be aligned along the extending direction of the erected portion 22D, corresponding to the plurality of terminal portions 23B provided on the separated portion. The terminal portion 23D corresponds to the "component attachment portion" of the present disclosure.

In a state in which the first bus bar 20A and the second bus bar 20B having the second shape illustrated in FIG. 5 are assembled to the housing 10, the fastening portion 21D of the first bus bar 20A (a portion including the stud bolt sb protruding from the fastening portion 21A) functions as the input and output portion 2A, the front end portion of the fastening portion 21C of the second bus bar 20B (a portion including the stud bolt sb protruding from the fastening portion 21B) functions as the input and output portion 2B, and the rear end portion of the fastening portion 21C of the second bus bar 20B (a portion including the stud bolt sb protruding from the fastening portion 21C) functions as the input and output portion 2C. That is, the auxiliary bus bar 20C is configured to compensate for a portion on the right side (in particular, the right fastening portion 21A) from the cutting point P separated from the first bus bar 20A having the first shape, and the auxiliary bus bar 20D is configured to compensate for a portion on the left side (in particular, a portion of the plurality of terminal portions 23B) from the cutting point Q separated from the second bus bar 20B having the first shape.

When the first shape illustrated in FIG. 3 is compared with the second shape illustrated in FIG. 5, regarding the plurality of "input and output portions" (the input and output portions 2A to 2C), in the first shape illustrated in FIG. 3, the input and output portions 2A and 2C belong to the first bus bar 20A and the input and output portion 2B belongs to the second bus bar 20B, whereas in the second shape illustrated in FIG. 5, unlike the first shape illustrated in FIG. 3, the input and output portion 2A belongs to the first bus bar 20A and the input and output portions 2B and 2C belong to the second bus bar 20B. Regarding the plurality of "component attachment portions" (the plurality of terminal portions 23A, 23B, 23C, and 23D), in the first shape illustrated in FIG. 3, the plurality of terminal portions 23A belong to the first bus bar 20A and the plurality of terminal portions 23B belong to the second bus bar 20B, whereas in the second shape illustrated in FIG. 5, unlike the first shape illustrated in FIG. 3, the plurality of terminal portions 23A and 23D belong to the first bus bar 20A and the plurality of terminal portions 23B and 23C belong to the second bus bar 20B. In other words, in the first shape illustrated in FIG. 3 and the second shape illustrated in FIG. 5, the arrangement and the number of the "input and output portions" belonging to the first bus bar 20A (the second bus bar 20B) are different for the plurality of "input and output portions" (the input and output portions 2A to 2C), and the arrangement and the number of the "component attachment portions" belonging to the first bus bar 20A (the second bus bar 20B) are also different for the plurality of "component attachment portions" (the plurality of terminal portions 23A, 23B, 23C, and 23D).

Operation and Effect

As described above, according to the method for manufacturing the electric junction box 1 of the present embodiment, the shape of the first bus bar 20A and the second bus bar 20B is selected to be the first shape or the second shape based on the specifications required for the electric junction box 1. Here, in the first shape, the first bus bar 20A serves as part (the input and output portions 2A and 2C) of the plurality of input and output portions, and the second bus bar 20B serves as the remaining part (the input and output portion 2B) other than the part of the plurality of input and output portions. In the second shape, the first bus bar 20A serves as the other part (the input and output portion 2A) of the plurality of input and output portions, and the second bus bar 20B serves as the remaining part (the input and output portions 2B and 2C) other than the other part of the plurality of input and output portions. By changing the shape of the first bus bar 20A and the second bus bar 20B in this manner, it is possible to cope with various required specifications. In addition, regardless of whether the first bus bar 20A and the second bus bar 20B have the first shape or the second shape, the housing 10 can accommodate the first bus bar 20A and the second bus bar 20B. Accordingly, the method for manufacturing the electric junction box 1 according to the present embodiment can reduce the types (product numbers) of the bus bars and the housings to be prepared while implementing the electric junction box 1 so as to meet a plurality of required specifications.

The first bus bar 20A and the second bus bar 20B having the basic shape are used in the first shape, and the auxiliary bus bar 20C or the auxiliary bus bar 20D is assembled by separating (for example, cutting and removing) a portion from the first bus bar 20A and the second bus bar 20B having the basic shape, in the second shape. Accordingly, it is possible to reduce the types (product numbers) of bus bars and housings to be prepared without excessively complicating a manufacturing process of the electric junction box 1.

Other Embodiments

The present disclosure is not limited to the embodiments described above, and various modifications can be adopted within the scope of the present disclosure. For example, the present disclosure is not limited to the embodiments described above, and modifications, improvements, and the like can be appropriately made. In addition, materials, shapes, dimensions, numbers, arrangement positions, and the like of the respective constituent elements in the embodiments described above are freely selected and are not limited as long as the present disclosure can be implemented.

Here, aspects of the embodiments of the method for manufacturing the electric junction box of the present disclosure as mentioned above are summarized and listed below.

According to an aspect 1 of the present disclosure, a method for manufacturing an electric junction box, the electric junction box (1) including: a first bus bar (20A) having one shape selected from a plurality of types of shapes; a second bus bar (20B) having one shape selected from a plurality of types of shapes; a housing (10) that accommodates the first bus bar (20A) and the second bus bar (20B); and a plurality of input and output portions (2A to 2C) to which a terminal connected to an external power supply is connectable. The first bus bar (20A) and the second bus bar (20B) have a selectable shape that is one of a first shape and a second shape. The first shape is a shape where parts (2A, 2C) of the plurality of input and output portions are a member of the first bus bar (20A) and the other part (2B) of the plurality of input and output portions is a member of the second bus bar (20B), and the second shape is a shape where a part (2A) of the plurality of input and output portions is a member of the first bus bar (20A) and the other parts (2B, 2C) of the plurality of input and output portions are a member of the second bus bar (20B). The housing (10) is configured to accommodate the first bus bar (20A) and the second bus bar (20B) that have the first shape and the first bus bar (20A) and the second bus bar (20B) that have the second shape. The manufacturing method includes: a first operation of providing the first bus bar (20A) and the second bus bar (20B) that have one of the first shape and the second shape selected based on a specification of the electric junction box (1); and a second operation of accommodating the first bus bar (20A) and the second bus bar (20B) provided by the first operation in the housing (10).

According to the electric junction box having the above aspect 1, the shape of the first bus bar and the second bus bar is selected to be one of the first shape and the second shape based on the specifications required for the electric junction box. Here, in the first shape, the first bus bar serves as parts of the plurality of input and output portions, and the second bus bar serves as the other part of the plurality of input and output portions. In the second shape, the first bus bar serves as a part of the plurality of input and output portions, and the second bus bar serves as the other parts of the plurality of input and output portions. By changing the shape of the first bus bar and the second bus bar in this manner, it is possible to cope with various required specifications. In addition, regardless of whether the first bus bar and the second bus bar have the first shape or the second shape, the housing can accommodate the first bus bar and the second bus bar. According to the manufacturing method of the present configuration, it is possible to reduce the types (product numbers) of the bus bars and the housings to be prepared while implementing the electric junction box so as to meet the plurality of required specifications.

According to an aspect 2 of the present disclosure, the first operation includes: when the first shape is selected, using the first bus bar (20A) and the second bus bar (20B) having a predetermined basic shape; and when the second shape is selected, performing at least one of a first process and a second process, the first process including separating a portion of the first bus bar (20A) having the basic shape and assembling a first auxiliary bus bar (20C) to the second bus bar (20B) so as to compensate for the separated portion of the first bus bar, and the second process including separating a portion of the second bus bar (20B) having the basic shape and assembling a second auxiliary bus bar (20D) to the first bus bar (20A) so as to compensate for the separated portion of the second bus bar.

According to the method for manufacturing an electric junction box having the above aspect 2, the first bus bar and the second bus bar having the basic shape are used in the first shape, and a first auxiliary bus bar or a second auxiliary bus bar is assembled by separating (for example, cutting and removing) a portion from the first bus bar and the second bus bar having the basic shape, in the second shape. Thus, according to the manufacturing method of the present configuration, it is possible to reduce the types (product numbers) of the bus bars and the housings to be prepared without excessively complicating the manufacturing process of the electric junction box.

According to an aspect 3 of the present disclosure, the electric junction box (1) further includes a plurality of component attachment portions (23A to 23D) to which an electronic component (R) is attachable. The first shape is the shape where a part (23A) of the plurality of component attachment portions is a member of the first bus bar (20A) and the other part (23B) of the plurality of component attachment portions is a member of the second bus bar (20B). The second shape is the shape where parts (23A, 23D) of the plurality of component attachment portions are a member of the first bus bar (20A), and the other parts (23B, 23C) of the plurality of component attachment portions are a member of the second bus bar (20B).

According to the method for manufacturing an electric junction box having the above aspect 3, in the first shape, the first bus bar serves as a part of the plurality of component attachment portions, and the second bus bar serves as the other part of the plurality of component attachment portions. In the second shape, the first bus bar serves as parts of the plurality of component attachment portions, and the second bus bar serves as the other parts of the plurality of component attachment portions. Accordingly, by changing the shape of the first bus bar and the second bus bar, it is possible to cope with more various required specifications.

According to the method for manufacturing an electric junction box of the present disclosure, the shape of the first bus bar and the second bus bar is selected to be one of the first shape and the second shape based on the specifications required for the electric junction box. Here, in the first shape, the first bus bar serves as a part of the plurality of input and output portions, and the second bus bar serves as the remaining part other than the part. In the second shape, the first bus bar serves as another part of the plurality of input and output portions, and the second bus bar serves as the remaining part other than the other part. By changing the shape of the first bus bar and the second bus bar in this manner, it is possible to cope with various required specifications. In addition, regardless of whether the first bus bar and the second bus bar have the first shape or the second shape, the housing can accommodate the first bus bar and the second bus bar. According to the manufacturing method of the present configuration, it is possible to reduce the types (product numbers) of the bus bars and the housings to be prepared while implementing the electric junction box so as to meet the plurality of required specifications.

What is claimed is:

1. A method for manufacturing an electric junction box, the electric junction box including:
   a first bus bar having one shape selected from a plurality of types of shapes;
   a second bus bar having one shape selected from a plurality of types of shapes;

a housing that accommodates the first bus bar and the second bus bar; and a plurality of input and output portions to which a terminal connected to an external power supply is connectable, wherein the first bus bar and the second bus bar have a selectable shape that is one of a first shape and a second shape, the first shape being a shape where parts of the plurality of input and output portions are a member of the first bus bar and the other part of the plurality of input and output portions is a member of the second bus bar, and the second shape being a shape where a part of the plurality of input and output portions is a member of the first bus bar and the other parts of the plurality of input and output portions are a member of the second bus bar, the housing is configured to accommodate the first bus bar and the second bus bar that have the first shape and the first bus bar and the second bus bar that have the second shape, and the manufacturing method comprises:

a first operation of providing the first bus bar and the second bus bar that have one of the first shape and the second shape selected based on a specification of the electric junction box; and a second operation of accommodating the first bus bar and the second bus bar provided by the first operation in the housing.

2. The method for manufacturing the electric junction box according to claim 1, wherein the first operation includes:

when the first shape is selected, using the first bus bar and the second bus bar having a predetermined basic shape; and when the second shape is selected, performing at least one of a first process and a second process, the first process including separating a portion of the first bus bar having the basic shape and assembling a first auxiliary bus bar to the second bus bar so as to compensate for the separated portion of the first bus bar, and the second process including separating a portion of the second bus bar having the basic shape and assembling a second auxiliary bus bar to the first bus bar so as to compensate for the separated portion of the second bus bar.

3. The method for manufacturing the electric junction box according to claim 1, wherein the electric junction box further includes a plurality of component attachment portions to which an electronic component is attachable, the first shape is the shape where a part of the plurality of component attachment portions is a member of the first bus bar and the other part of the plurality of component attachment portions is a member of the second bus bar, and the second shape is the shape where parts of the plurality of component attachment portions are a member of the first bus bar, and the other parts of the plurality of component attachment portions are a member of the second bus bar.

* * * * *